Oct. 13, 1953

E. W. CARROLL ET AL 2,655,247

CHERRY ORIENTATOR

Filed March 12, 1951

INVENTORS:
ELLSWORTH W. CARROLL
JOHN W. EDGEMOND Jr.
BY HOLGER J. JESPERSEN

Herbert E. Metcalf
THEIR PATENT ATTORNEY

Oct. 13, 1953 E. W. CARROLL ET AL 2,655,247
CHERRY ORIENTATOR
Filed March 12, 1951 6 Sheets-Sheet 4

INVENTORS
ELLSWORTH W. CARROLL
JOHN W. EDGEMOND, JR.
BY HOLGER J. JESPERSEN

Herbert E. Metcalf
THEIR PATENT ATTORNEY

Oct. 13, 1953 E. W. CARROLL ET AL 2,655,247
CHERRY ORIENTATOR
Filed March 12, 1951 6 Sheets-Sheet 5

INVENTORS
ELLSWORTH W. CARROLL
JOHN W. EDGEMOND, Jr.
BY HOLGER J. JESPERSEN

Herbert E. Metcalf
THEIR PATENT ATTORNEY

INVENTORS
ELLSWORTH W. CARROLL
JOHN W. EDGEMOND, JR.
BY HOLGER J. JESPERSEN

THEIR PATENT ATTORNEY

Patented Oct. 13, 1953

2,655,247

UNITED STATES PATENT OFFICE 2,655,247

CHERRY ORIENTATOR

Ellsworth W. Carroll, Redwood City, John W. Edgemond, Jr., Los Altos, and Holger J. Jespersen, Menlo Park, Calif., assignors to S & W Fine Foods, Inc., San Francisco, Calif., a corporation of California Application March 12, 1951, Serial No. 215,044

22 Claims. (Cl. 198—33)

1

The present invention relates to devices for the orientation of indented fruit, such as cherries, for example.

Indented fruit, such as cherries, plums, peaches, and the like, can be orientated by the use of an orientation member on which the fruit rests, this member being shaped to enter the stem indent of the fruit when registry of the member and the indent occurs during rotation of the fruit by the orientation member. An excellent example of such a device is the arrangement shown, described, and claimed in the Carroll Patent No. 2,220,511, issued November 5, 1940, in which a wheel is used to support at least part of the weight of an indented fruit, and the wheel is then rotated to rotate the fruit. The wheel is proportioned to enter the indent of the fruit when registry occurs. When entry has been accomplished the fruit is no longer rotated as sufficient frictional contact between wheel and fruit to cause fruit rotation has been lost.

Such orientation devices and many other types are sensitive, as far as percentage orientation is concerned, to the size of the fruit indent with respect to the projection of its orientation member into the fruit support. Fruit graded to sizes where the diameter range is relatively small are orientated to high percentages of properly orientated fruit when the diameter of an orientation wheel, for example, is closely coordinated with the size of fruit being orientated. Fruit of other graded sizes, however, are not orientated with such high percentages unless the size of the orientation wheel and/or the projection thereof into the fruit support is also changed. Thus, grading as a separate operation on the fruit together with the use of the properly coordinated and positioned orientation member should be used in order to consistently obtain high orientation percentage. If the grading is dispensed with, the percentage of orientation with a given wheel set-up may be significantly lower unless, of course, orchard run fruit is consistently of relatively uniform size and properly related to the wheel size and position. This latter condition is very unusual and an orientation device that will consistently produce high orientation percentages of batches of fruit in which the sizes vary widely (as in normal orchard run fruit) has been widely sought after in the art.

It is an object of the present invention to provide a means for orientating indented fruit applicable without change for the orientation of fruit with a wide range of sizes with high efficiency.

2

It is another object of the invention to provide a fruit orientation device providing, without change, substantially equal percentage orientation of fruit differing materially in size.

It is a still further object of the present invention to provide a fruit rotating and orientating member suitable for rotating and orientating fruit of widely differing sizes with substantially the same percentage orientation, and to provide a relatively simple device for orientating indented fruit with a high percentage of orientation.

It is still another object of the invention to provide a means for orientating indented fruit in the same receptacle in which it is to be pitted.

To accomplish these objects, the invention involves the use of a fruit receptacle having a central bottom aperture therein. As indented fruit such as cherries are customarily pitted in a concave cup formed of elastic material such as rubber, the cup having a central bottom hole therein for the cherry pit to pass when forced therethrough by a pitting knife applied to the top of the cherry; such a pitting cup may be used to support the fruit during orientation. By orientation in the pitting cup itself, no transfer of the fruit to a support suitable for pitting need be made.

Orientation is accomplished in one manner according to the present invention, by placing a plurality of pitting rubbers on a carrier and progressing the carrier over a horizontal path. While on an orientation portion of the path, a pilot member is inserted in the bottom holes of the receptacle at an angle to the vertical axis of the receptacle and by an amount where the exterior surface of a fruit in the receptacle away from the indent will be contacted. The pilot member is then reciprocated rapidly and the tangential contact thereof with the fruit rotates the fruit rapidly. When the fruit has rotated so that the indent is over the receptacle hole, the rotation of the fruit will stop because the reciprocating pilot member no longer can contact the fruit, and the fruit will then remain in a position where the pit can later be forced out of the fruit through the indent area and through the pitting hole. This pitting action can take place, as after a time period spent in the orientation portion of the path, the pilot member swings downwardly out of the pitting hole to leave the way clear for the pitting knife. As the pilot member need only enter the receptacle to a very small extent, good orientation takes place with fruit having either large or small indents, as may be encountered in large and small fruit respectively. In consequence, high percentage orientation can be made on orchard run fruit having a relatively wide size range. Grading can therefore be omitted in most instances.

The above objects and advantages of the present invention can be more fully understood by reference to the drawings showing a preferred embodiment of the invention, and in which.

Figure 1:
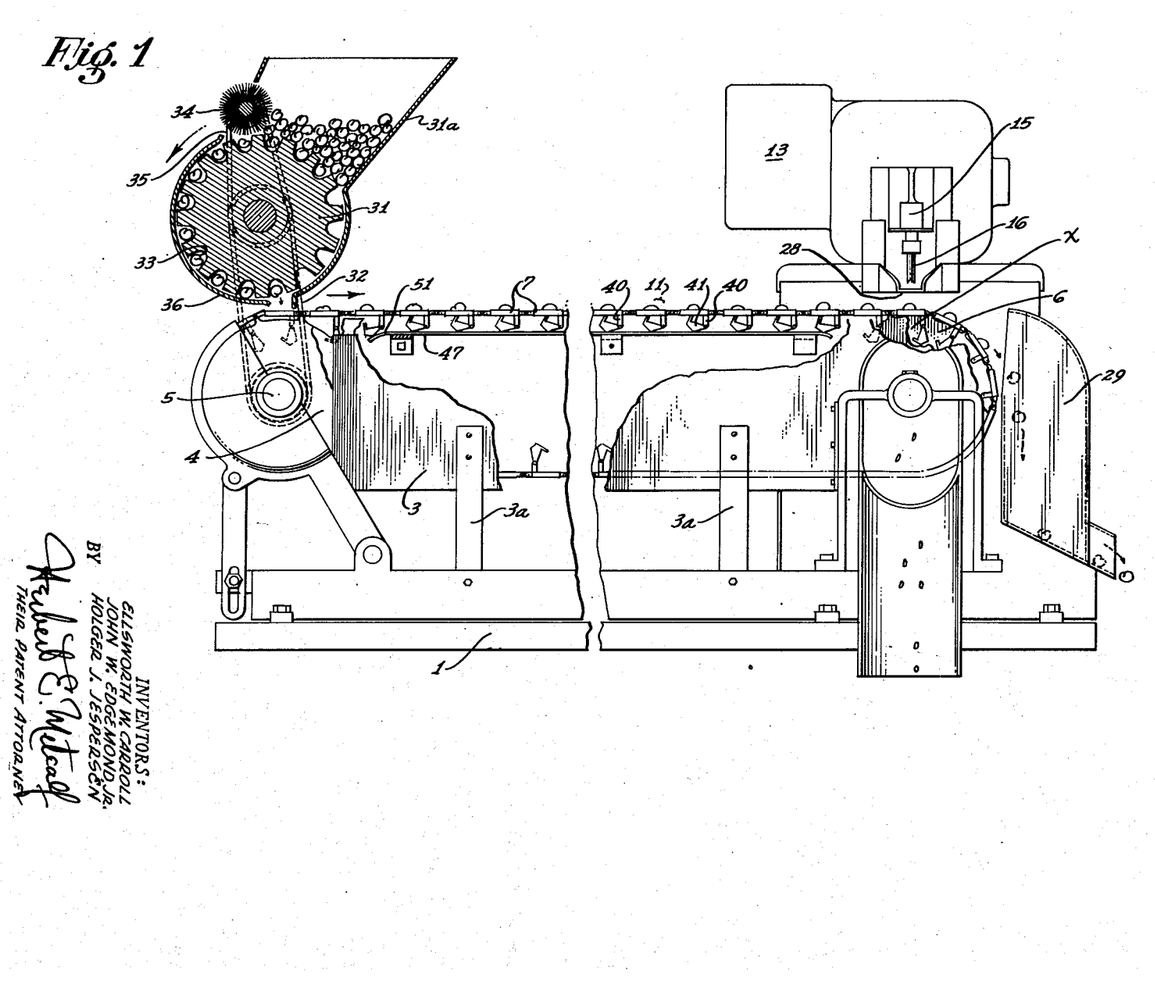
Figure 1 is a longitudinal view partly in elevation and partly in vertical section of a complete cherry orientating and pitting machine using the pitting mechanism of the Connor et al. Patent No. 2,092,956, and embodying one form of the present invention.
Figures 2, 2A:
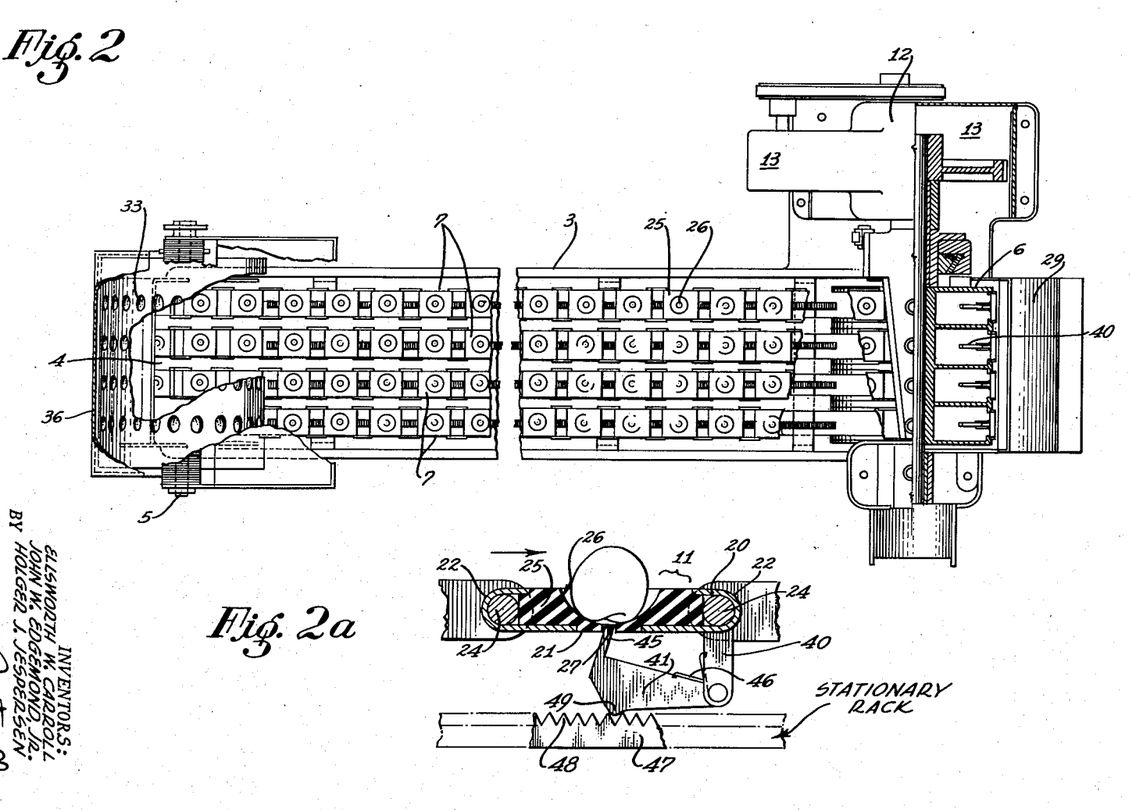
Figure 2 is a top plan view of the machine of Figure 1.
Figure 2a is a vertical sectional view partly in elevation of a portion of the machine of Figures 1 and 2 showing one means for reciprocating the fruit orientating member.

Referring first to Figures 1 and 2 for a brief general description of a cherry pitting machine of the Connor et al. type in which the present invention is incorporated, a base plate 1 supports at one end thereof a pair of spaced side plates 3 by legs 3a. At one end of side plates 3 an idler drum 4 is positioned to rotate on a horizontal idler drum shaft 5. At the other end of side plates 3 is positioned a polygonal driving cam 6.

A plurality of carrier chains 7 are mounted on drums 4 and 6, each of these chains 7 comprising a plurality of fruit supporting receptacles 11, these receptacles being pivotally linked together to provide a chain action as the carrier chains pass around drums 4 and 6. These receptacles will be more fully described later. Continuous motion is given to the chains 7 by motor 12 acting through a gear box 13 to rotate driving drum 6.

Mounted above driving drum 6 is a pitting knife assembly 15 rotatable on an axis common with that of the driving drum 6, and carrying pitting knives 16, one for each chain, movable over a radial path with respect to driving drum 6. By the use of an intermittent motion mechanism (not shown) in gear box 13, the pitting knife assembly 15 moves with the carrier chains 7 as they pass around driving drum 6, with the pitting knives being reciprocated by gear box mechanism (not shown) to force pits from fruit carried by the receptacles 11. The pitting knife assembly 15 is then rapidly returned to the original position, with the pitting knives 16 being raised ready to pit fruit in the next receptacles arriving at driving drum 6, as fully explained in the cited Conner et al. patent.

The receptacles 11 are shown in detail in Figure 2a. A metal frame 20 having a large central aperture 21 is folded over at opposite edges 22 to form bearings for link pins 24. The turned edges 22 serve to hold a pitting rubber 25 having an upper concave recess 26 therein, and a pit hole 27 centrally positioned in the bottom of the recess 26.

During pitting of the fruit, the knife 16 enters the fruit supported on the rubber, engages the pit and forces it through the pit hole 27 in the elastic bottom of the pitting rubber 25, the pit hole 27 having a diameter less than the average diameter of the pits of the fruit being pitted. As the receptacles 11 pass over the driving drum 6, the exterior surface of this drum is cut away so that the pits can enter the interior of the drum, from which they can be removed laterally.

In order that the pitted fruit can readily be removed from the knives 16, each knife 16 is provided with a stripper plate 28 through which the knife reciprocates. After being removed from the knives 16, the fruit falls into discharge chute 29.

Loading of the fruit can conveniently be provided by the use of a loading drum 31 positioned above idler drum 4. Loading drum 31 is positively driven from idler drum 4 by drum chain 32. Loading drum 31 is provided with peripheral rows of loading recesses 33, spaced to register with receptacles 11 as the loading drum 31 is rotated. Cherries fall by gravity from hopper 31a into loading recesses 33 and drop into the receptacles 11 by gravity as they arrive at the beginning of the horizontal part of the path of the carrier chains.

The present invention provides means for orientating the fruit to have the stem indent down while the fruit is on the horizontal portion of the carrier path between the loading position and the pitting position.

One embodiment of the invention is shown in Figures 1, 2, and 2a.

In this case, a bracket 40 is extended downwardly from the forward end of each pitting rubber frame 20 as best shown in Figure 2a. Pivoted on the end of bracket 40 is an orientation member 41 having an upwardly extending fruit rotating tip 45 so positioned that when the orientation member 41 is rotated upwardly the tip 45 will enter the pit hole 27 at an angle, as will be more fully explained later. Normally, orientation member 41 is swung downwardly by pivot spring 46.

Immediately beneath each line of receptacles and extending centrally beneath the orientation members 41, is positioned a stationary rack 47 having upwardly extending teeth 48 thereon, these teeth being positioned to contact a downwardly extending rider portion 49 on the orientation member 41.

The front end 51 of rack 47 is curved downwardly adjacent the idler drum 4, so that as the riders 49 contact front end 51, they are raised against the urge of pivot springs 46 to place each fruit rotating tip 45 at a pit hole 27. The teeth 48 of the rack 47 are sized so that they bear on each rider 49 to raise the orientation members to a point where the tips 45 thereof will enter the pit holes to contact the exterior of a fruit in the receptacles, with a reciprocating action as each rider 49 moves over the teeth 48.

This contact of rider and teeth occurs over substantially the entire horizontal path of the carrier.

Adjacent the pitting knife assembly, the rack 47 terminates, permitting the orientation members to be moved away by the pivot springs 47, thereby leaving the pit hole 27 unobstructed for the passage of the pitting knife 16, as shown, for example, at X in Figure 1.

In the embodiment shown in Figures 1, 2, and 2a, the orientation members 41 are shown as attached to each receptacle 11. In order that the number of orientation members required can be reduced, we may prefer to utilize the construction shown in Figures 3 and 3a.

Figure 3:
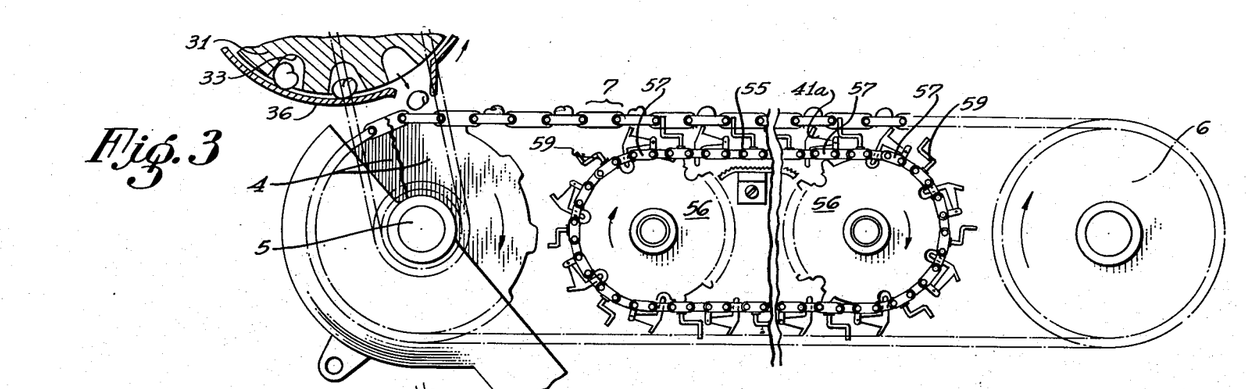
Figure 3 is a somewhat diagrammatic partial side view of a machine similar to that of Figures 1 and 2 showing another embodiment of the present invention.
Figure 3A:
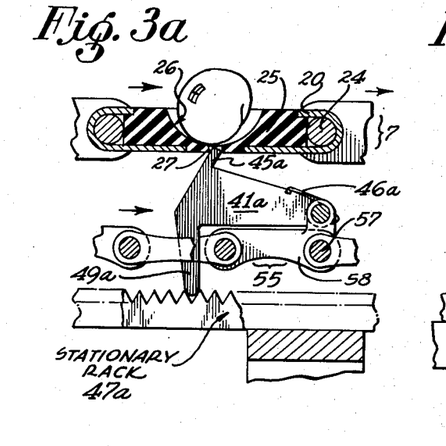
Figure 3a is a vertical sectional view of a portion of the machine of Figure 3 showing a different pilot member mounting.

Referring to Figures 3 and 3a for a description of this type of structure, a subcarrier in the form of a subcarrier chain 55 is positioned beneath each carrier chain 7, between drums 4 and 6. Each subcarrier chain 55 is mounted on spaced subcarrier sprockets 56, and each alternate link 57 carries an orientation member 41a similar to member 41, mounted on a link bracket 58. A pivot spring 46a is also used in this case to urge the orientation members 41a against the crosspins 57 of the subcarrier chain 55.

Subcarrier chain 55 is driven by outwardly extending drive pins 59 (shown in Figure 3), and these pins, attached to links between orientation members, as the main carrier chains 7 progress, contact and register with the links of the main carrier chains 7 to synchronize both the position and speed of travel of the orientation members 41a so that a fruit rotating tip 45a of the orientation member 41a is positioned beneath each pit hole 27 in the pitting rubbers.

Rider portions 49a of the orientation members 41a are in this case made sufficiently long so that they pass downwardly through the links of subcarrier chain 55 as best shown in Figure 3a.

A toothed rack 47a is positioned beneath subcarrier chain 55 to raise the fruit rotating tips 45a into the pit holes 27 and to reciprocate these tips 45a as in the embodiment shown in Figures 1, 2, and 2a. When long main carrier chains 7 are used, the use of the subcarrier arrangement shown in Figures 2 and 2a will greatly reduce the number of orientation members required.

Figure 4:
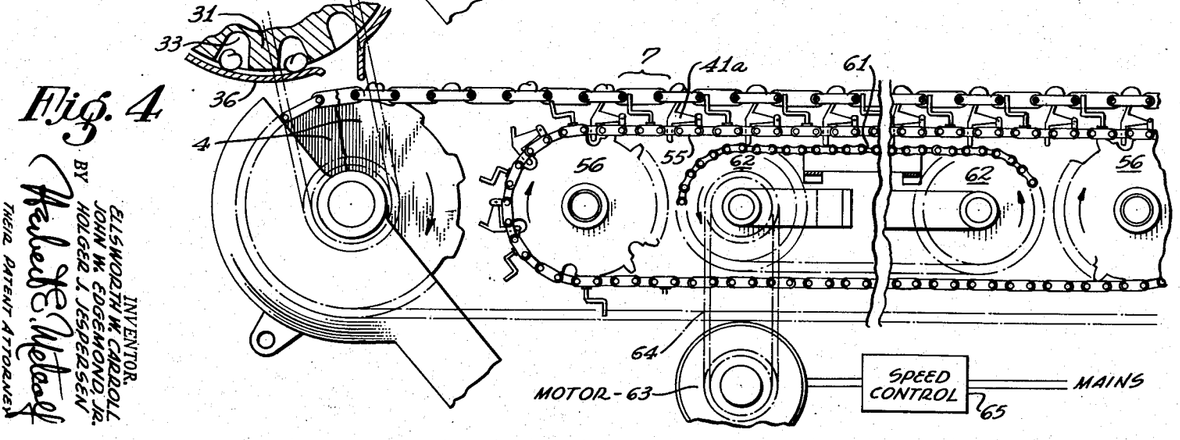
Figure 4 is a view similar to that of Figure 3 but showing still another embodiment of the present invention.
Figure 4A:
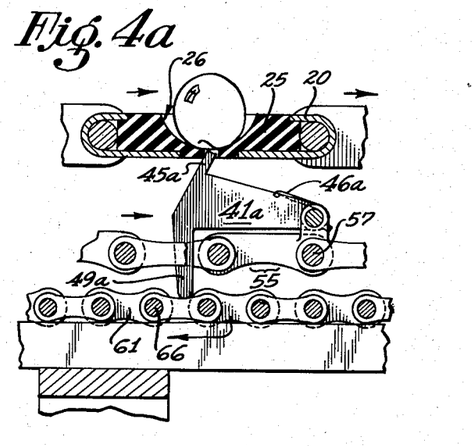
Figure 4a is a vertical sectional view of a portion of the machine of Figure 4 showing the arrangement of the orientation parts.

As it may be desirable to regulate the rate of tip reciprocation independently of the speed of progression of the main carrier chains 7, the system of Figures 4 and 4a can be used to good advantage.

With reference to these Figures 4 and 4a, the same subcarrier chains 55 are used as have been described in conjunction with Figures 3 and 3a and the same orientation members 41a are attached to chains 55. In this instance, however, a third chain 61 is positioned below each subcarrier chain 55, carried by third chain sprockets 62, one of these sprockets being independently driven by third chain motor 63 through sprocket belt 64. Motor 63 is preferably of the variable speed type controlled by a speed control device 65, as shown in Figure 4.

Rider portions 49a of orientation members 41a, as they pass along the horizontal path of the main carrier chains, are contacted by cross pins 66 of the third chain 61. When this chain 61 is driven in the direction preferably opposite to that of the main and subcarrier chains 7 and 55, respectively, the fruit rotating tips 45a of the orientation members 41a are reciprocated at a rate dependent upon the relation of the speed of the main and subcarrier chains 7 and 55, respectively, and of the third chain 61. Thus, by regulating the speed of the third chain 61, the number of reciprocations of the orientation members per unit time can be accurately regulated.

Figures 5, 5A:
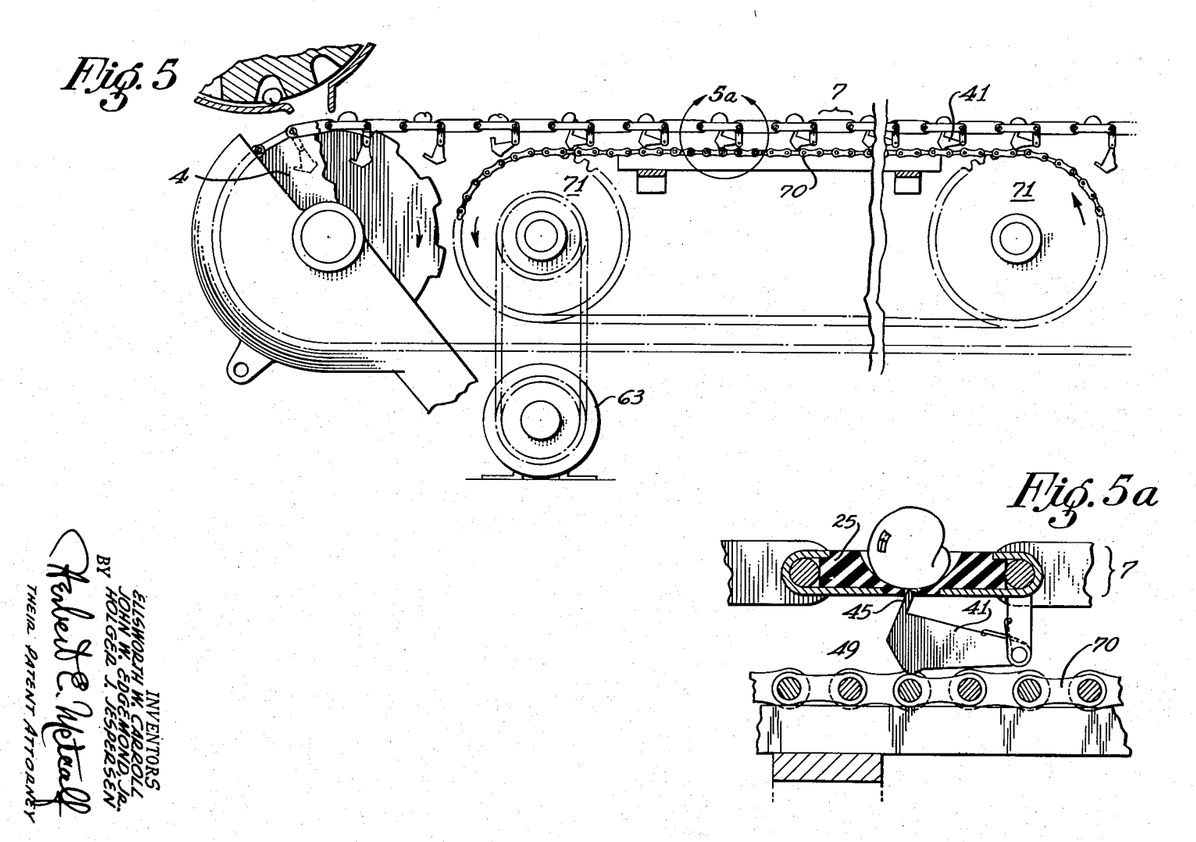
Figure 5 is a longitudinal view, partly in vertical section and partly in elevation, of part of a machine using still another embodiment of the invention.
Figure 5a is a vertical sectional view taken as indicated by the circle 5a in Figure 5.

A combination of certain features of the machine of Figures 1, 2, and 2a with certain features of Figures 4 and 4a is shown in Figures 5 and 5a.

Here, an orientation member 41 is attached to each receptacle as in the device of Figures 1, 2, and 2a. In this case, however, a reciprocation chain 70 (Figure 5) similar to third chain 61 in Figures 4 and 4a is positioned directly beneath each main carrier chain 7 in the position of rack 47 as used in the device of Figures 1, 2, and 2a. The reciprocation chain 70 is mounted on sprockets 71 to keep it parallel to the main chains 7 and is driven by a variable speed motor 63 in the same manner as third chain 61 was driven. Thus, in the device shown in Figures 5 and 5a, the reciprocation rate can be closely controlled. The constructions shown in Figures 4 and 4a and in Figures 5 and 5a are different only in construction, the machines of Figures 1, 2, and 2a utilizing more orientation members but one less chain than the machine of Figures 4 and 4a. The action is identical.

Figure 6:
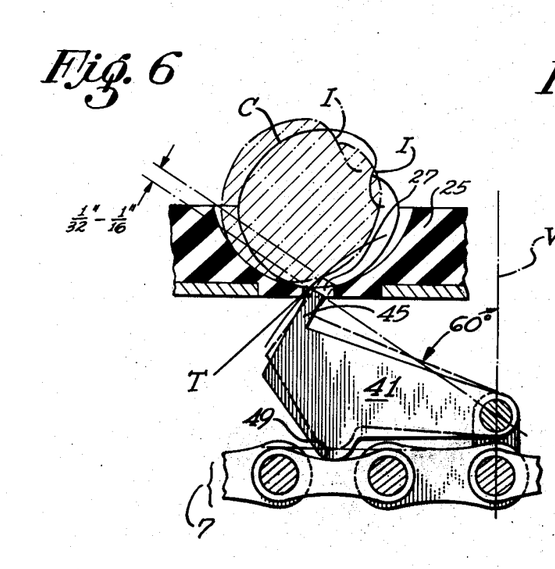
Figure 6 is an enlarged diagrammatic vertical section illustrating the orientation principles by which the embodiments of the previous figures operate.

Having described several types of machines embodying the present invention, the detailed construction and action of the orientation members 41 or 41a will next be described by reference to the diagram of Figure 6.

Figure 6A:
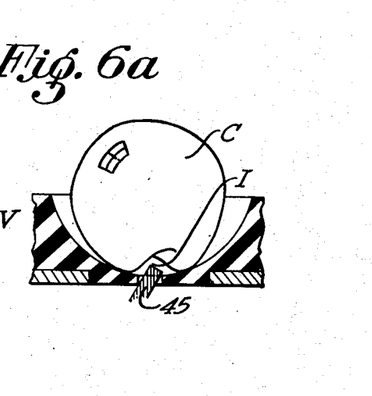
Figure 6a is a diagram of a portion of Figure 6 showing the fruit in orientated position.

It has been found by the recorded testing of thousands of cherries of all types and sizes that the motion of the fruit rotating tip 45 provides the optimum rotation of the cherries when the tangent T of the arc described by the tip 45 at the midpoint of the arc, as illustrated, is at about 60° to the vertical V, with a stroke of about $\frac{3}{32}$ to $\frac{1}{16}$ inch, inside of the rubber 25. The overall stroke will, of course, depend upon the thickness of the pitting rubber 25 at the pit hole 27. As long as the reciprocating tip 45 contacts a fruit in the receptacle, the fruit will be rotated. However, as soon as the indent I of the fruit C registers with the tip 45 as shown in Figure 6a, the tip 45 no longer can contact the fruit and the fruit remains with the indent down, which is the desired position. When the fruit is later pitted, the pit will be forced out through the indent area with a minimum of flesh loss and with minimum change in appearance.

Figure 8:
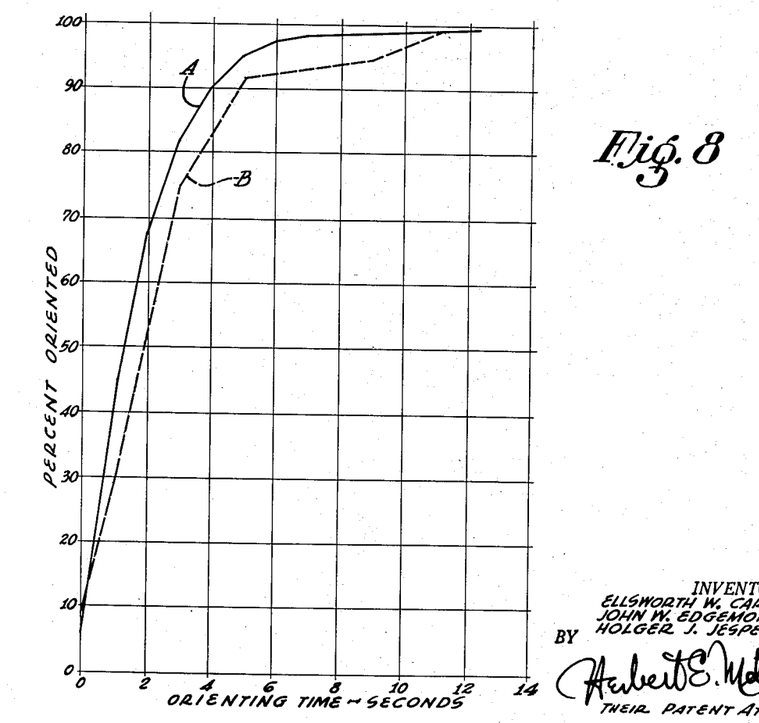
Figure 8 shows graphs of percentage orientation with respect to time for graded and ungraded fruit.

As the tip 45 can be made very small in diameter, i. e., $\frac{1}{32}$ of an inch or less in any direction, efficient orientation of both large and small fruit is attained. Recorded tests show that fruit of mixed sizes take somewhat longer to attain the same percentage of orientation as closely graded fruit, but that they both arrive at substantially the same maximum percentage orientation. The relation of the orientation of both graded and orchard run fruit is shown in Figure 8. Here, curve A represents the percentage of fruit orientated when a lot of fruit graded to be most favorable to a high percentage of orientation is processed. It will be noticed that the point of maximum practical return is at about 6.5 seconds. Curve B is a graph representing a batch of orchard run fruit containing a much wider size range than the fruit used to obtain curve A. In curve B, it would at first appear that the practical processing point occurred at about 4.5 seconds at about 91% orientation. However, at 10.5 seconds it was found that the percentage orientation was the same as that of the fruit recorded in curve A, showing that after about 6 additional seconds, the device of the present invention gave an orientation percentage for the mixed lot substantially the same as that of the graded lot. It is thus clear that the device of the present invention is not critically dependent in any way, for highest orientation percentages, on either fruit size or indent size. It is to be noted that the curves A and B of Figure 8 are for only such cherries in the two lots as are actually capable of being orientated, fruit having no indents or abnormal indentations larger than the stem indent not being counted.

Figure 7:
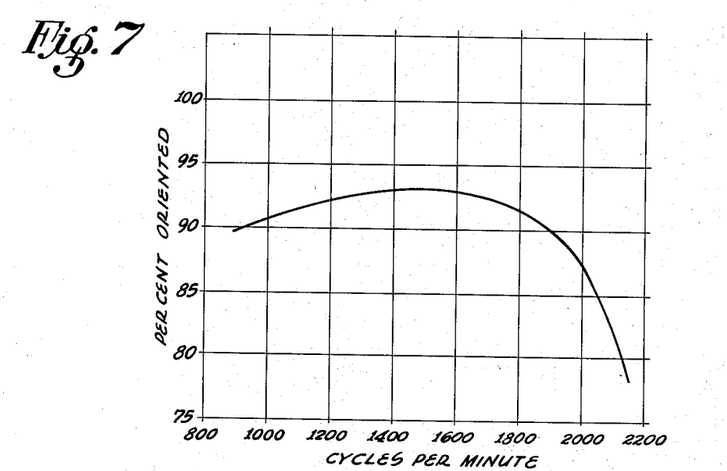
Figure 7 is a graph showing how precentage orientation changes with frequency of orientation member reciprocation.

In Figure 7, the relation of tip reciprocation with the percentage orientation is shown. All points on the curve in this figure were taken from the same lot of fruit, complete orchard run, thus accounting for a somewhat lower maximum than indicated in Figure 8. This curve shows that the optimum reciprocation rate is about 1500 cycles per minute with a satisfactory range of from about 850 c. p. m. to 1859 c. p. m. The rapid drop-off above 1850 c. p. m. is due to the fact that the cherry at these rates is bounced in the air too long between tip contacts and is not regularly contacted by the tip.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

We claim:

1. In a machine for orientating indented fruit, a generally horizontal receptacle for holding said fruit against gravity, said receptacle having a central bottom aperture therein, a fruit orientating member positioned to enter said receptacle through said aperture over an arc the tangent at the midpoint thereof being at an angle to the vertical, the upper tip of said member being movable over said arc from a point below the level of the bottom of said receptacle to a point above said level, and means for oscillating said member between said two points to rotate a fruit in said receptacle by tangential contact with said fruit.

2. Apparatus in accordance with claim 1 wherein said angle is on the order of 60°.

3. Apparatus in accordance with claim 1 wherein the rate of oscillation of said tip is from about 800 to about 1900 cycles per minute.

4. Apparatus in accordance with claim 1 wherein at least the bottom portion of said receptacle is of rubber-like elastic material and wherein the diameter of said aperture is less than the average diameter of the pits of the fruit being orientated.

5. Apparatus in accordance with claim 1 wherein at least the bottom portion of said receptacle is of rubber-like elastic material, wherein the diameter of said aperture is less than the average diameter of the pits of the fruit being orientated, and wherein said angle is on the order of 60°.

6. Apparatus in accordance with claim 1 wherein at least the bottom portion of said receptacle is of rubber-like elastic material, wherein the diameter of said aperture is less than the average diameter of the pits of the fruit being orientated, wherein said angle is on the order of 60°, and the rate of said oscillation is within the range of from about 800 to about 1900 cycles per minute.

7. Means for orientating cherries and the like comprising a pitting rubber having a central bottom aperture therein, an orientation member positioned beneath said receptacle, and having a tip thereon, said member being mounted so that said tip is movable from an upper fruit contacting point below the bottom of said receptacle to a point above the bottom of said receptacle through the central aperture of said receptacle over an arc, the tangent at the mid-point of which forms a substantial angle with the vertical, and means for oscillating said member to cause said tip to oscillate over said arc.

8. Apparatus in accordance with claim 7 wherein said angle is on the order of 60°.

9. Apparatus in accordance with claim 7 wherein the rate of oscillation of said member is from about 800 to about 1900 cycles per minute.

10. Fruit orientation means comprising a carrier, a plurality of pitting rubber frames attached to said carrier, a pitting rubber attached to each frame, said rubbers having an upper cup-shaped recess therein and a central aperture in the bottom thereof, means for progressing said carrier over a horizontal path, a bracket movable with each frame over said path and positioned below and at one side of the aperture in the rubber attached to said frame, an arm pivotally attached at one end to said bracket, the other end of said arm having a tip thereon extending upwardly in a position to enter said aperture, means urging said arm downwardly away from said aperture, means for moving said arm to place said tip in said aperture as said carrier is progressed, and means for oscillating said arm to move said tip into and out of said recess during progression of said carrier.

11. Apparatus in accordance with claim 10 wherein said arm is provided with a downwardly extending portion and wherein said arm oscillating means is a member with an upper surface having a plurality of high and low portions thereon positioned to contact said downwardly extending portion of said arm as said carrier is progressed.

12. Apparatus in accordance with claim 6 wherein said arm is provided with a downwardly extending portion and wherein said arm oscillating means is a rack having upwardly extending teeth thereon positioned to be contacted by said downwardly extending portion of said arm as said carrier is progressed.

13. Apparatus in accordance with claim 10 wherein said arm is provided with a downwardly extending portion and wherein said arm oscillating means is a chain having cross links positioned to be contacted by said downwardly extending portion of said arm as said carrier is progressed, and with means for progressing said chain at a speed different from that of said carrier.

14. Apparatus in accordance with claim 10 wherein said arm is provided with a downwardly extending portion and wherein said arm oscillating means is a chain having cross links positioned to be contacted by said downwardly extending portion of said arm as said carrier is progressed, and with means for progressing said chain in a direction opposite to the progression direction of said carrier.

15. Apparatus in accordance with claim 10 wherein the rate of oscillation of said arm is from about 800 to 1900 cycles per minute.

16. Apparatus in accordance with claim 10 wherein the tangent of the arc of movement of said tip at the midpoint of said arc is on the order of 60° to the vertical.

17. Apparatus in accordance with claim 10 wherein the tangent of the arc of movement of said tip at the midpoint of said arc is on the order of 60° to the vertical, and wherein the rate of oscillation is from about 800 to about 1900 cycles per minute.

18. Apparatus in accordance with claim 10 wherein said brackets are attached to said frames.

19. Apparatus in accordance with claim 10 wherein a subconveyor is provided below said carrier, said brackets being attached to said subconveyor, and with means for moving said subconveyor in synchronism with said carrier.

20. In a machine for orientating indented fruit, a generally horizontal receptacle for holding said fruit against gravity, said receptacle having a central bottom aperture therein, a fruit orientating member having an upper tip positioned to enter said receptacle through said aperture, said upper tip being movable from a point below the level of the bottom of said receptacle to a point above said level, a line drawn between said two points being at an angle to the vertical, and means for rapidly moving said upper tip back and forth between said two points to rotate a fruit in said receptacle by tangential contact with said fruit.

21. Apparatus in accordance with claim 20 wherein the angle of said line is on the order of 60°.

22. Apparatus in accordance with claim 20 wherein the rate of back and forth movement of said tip is from about 800 to about 1900 cycles per minute.

ELLSWORTH W. CARROLL.
JOHN W. EDGEMOND, Jr.
HOLGER J. JESPERSEN.

References Cited in the file of this patent

UNITED STATES PATENTS

| Number | Name | Date |
|---|---|---|
| 2,563,443 | Wormser | Aug. 7, 1951 |